June 7, 1932. L. C. SHIPPY 1,861,758
APPARATUS FOR DIVIDING METAL
Filed Jan. 24, 1931 4 Sheets-Sheet 1
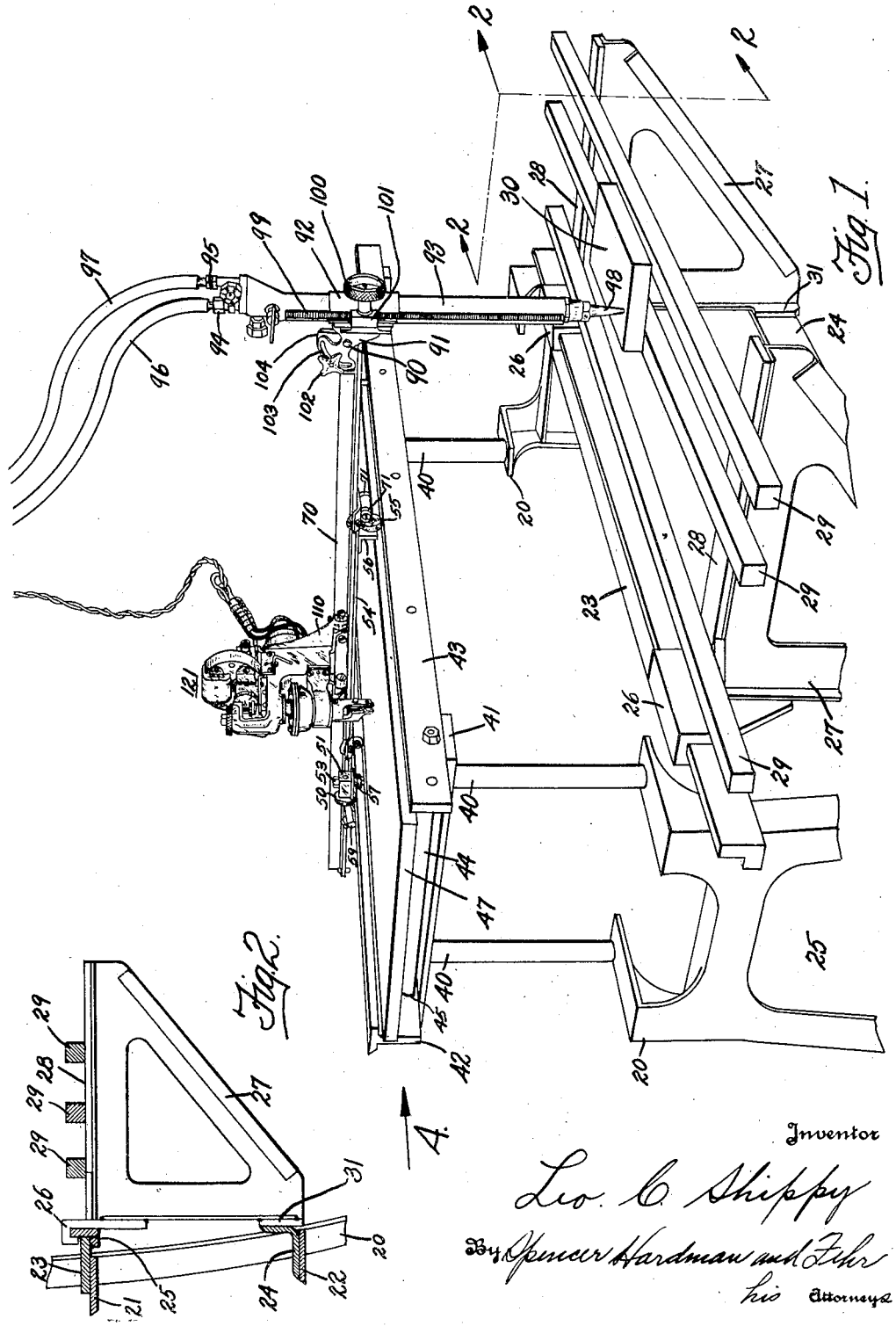

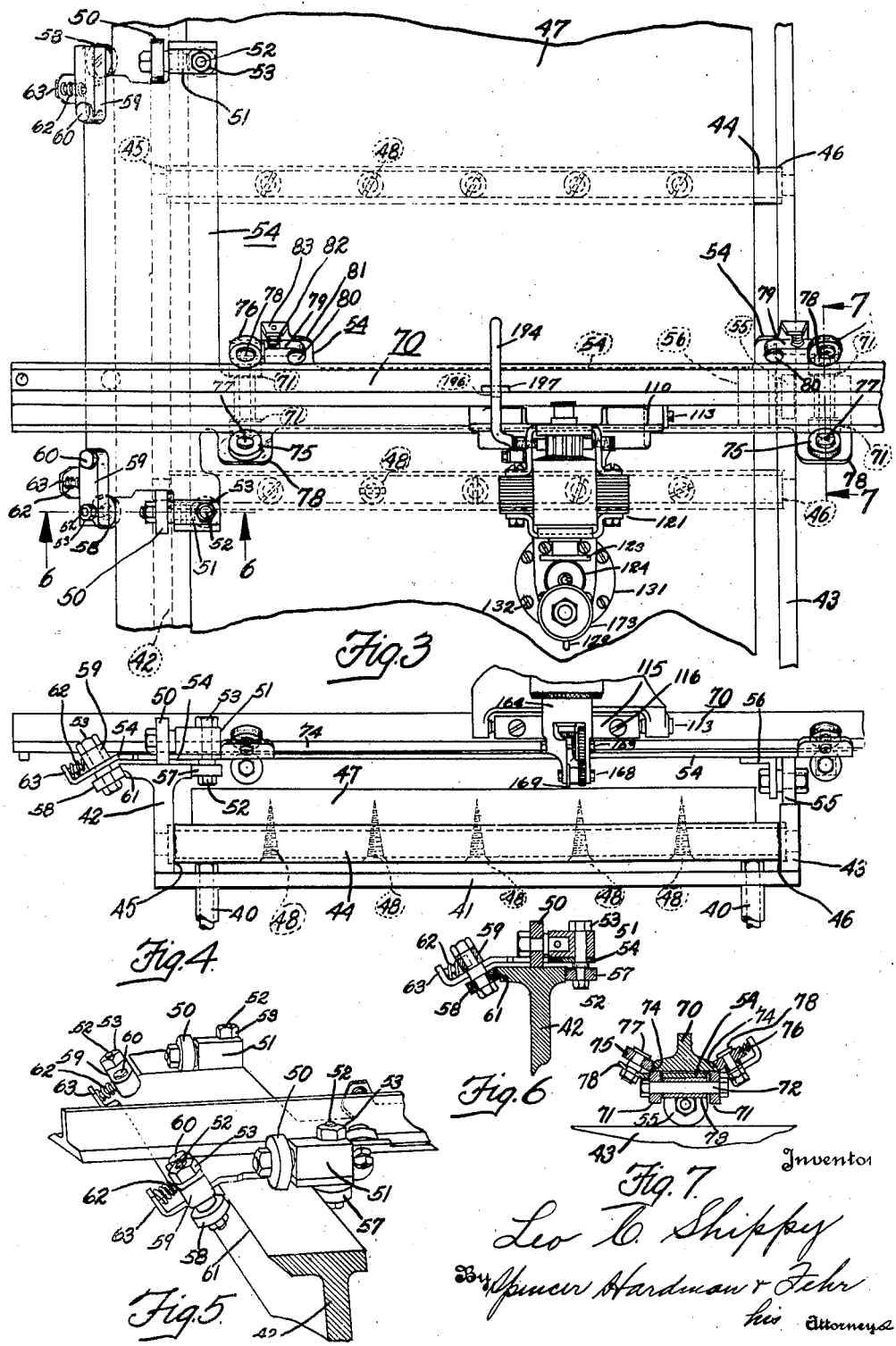

June 7, 1932.  L. C. SHIPPY  1,861,758
APPARATUS FOR DIVIDING METAL
Filed Jan. 24, 1931  4 Sheets-Sheet 3
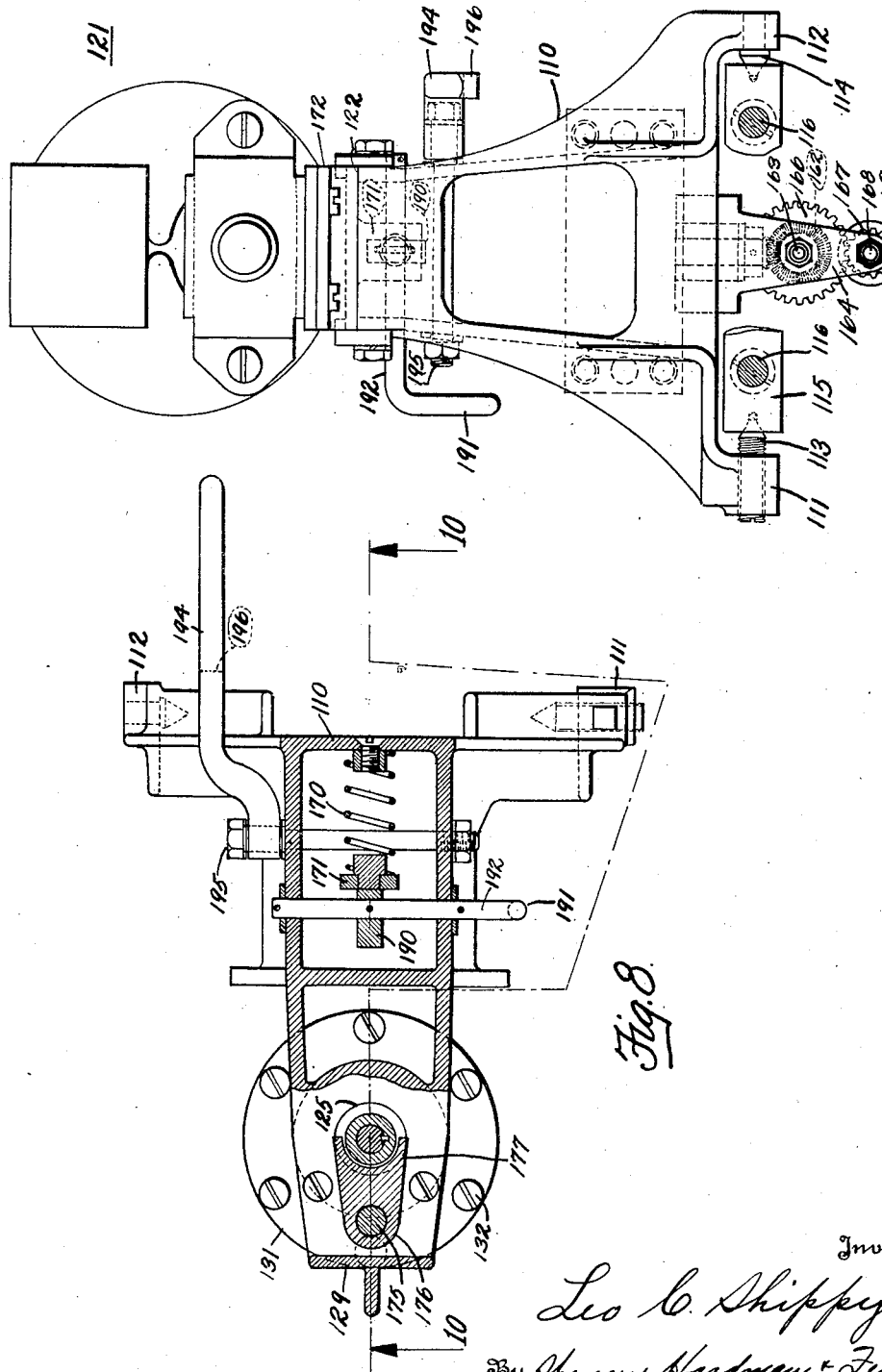

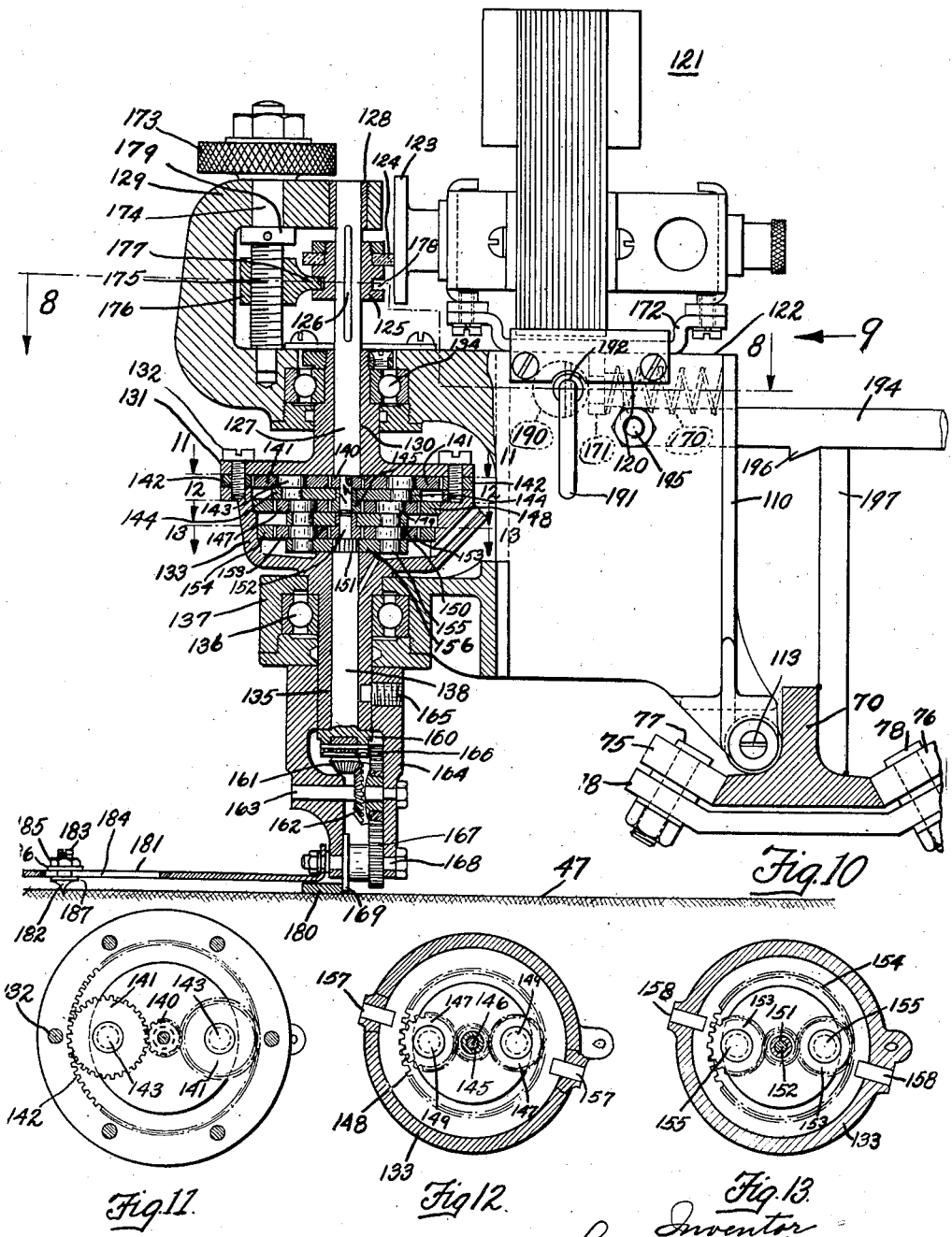

Patented June 7, 1932

1,861,758

UNITED STATES PATENT OFFICE

LEO C. SHIPPY, OF ANDERSON, INDIANA, ASSIGNOR TO DELCO-REMY CORPORATION, OF ANDERSON, INDIANA, A CORPORATION OF DELAWARE

APPARATUS FOR DIVIDING METAL

Application filed January 24, 1931. Serial No. 510,976.

This invention relates to apparatus for "cutting" or dividing a block of metal by means of a torch such as an oxygen acetylene torch which "cuts" through metal by the rapid heating of a relatively limited portion thereof above the melting point of the metal.

One of the objects of the invention is to provide means for propelling the torch at a uniform rate of speed in order that the torch when operating upon a plate of uniform thickness will melt away a portion thereof of uniform width with the result that the outline of the piece cut out by the torch will not be irregular due to the fact that the torch was not uniformly moved while operating upon the plate of metal.

A further object of the invention is to provide for movement of the torch according to a template or drawing of an object of the desired contour. This aim of the invention is accomplished in the disclosed embodiment thereof by mounting the torch upon a carriage propelled by a wheel which rests upon a plane table to which a template may be secured or upon which a sheet of paper bearing a drawing may be fastened. The carriage wheel is rotated at a uniform speed by a small electric motor supported by the carriage and the carriage wheel is journalled in a bracket which may be manually turned so that the wheel will track with any sort of line or template secured to the table.

Further objects and advantages of the present invention will be apparent from the following description, reference being had to the accompanying drawings wherein a preferred embodiment of one form of the present invention is clearly shown.

In the drawings:

Fig. 1 is a fragmentary perspective view of apparatus embodying the present invention.

Fig. 2 is a fragmentary sectional view on the line 2—2—2 of Fig. 1.

Fig. 3 is a fragmentary plan view.

Fig. 4 is a fragmentary end view looking in the direction of the arrow 4 in Fig. 1.

Fig. 5 is a fragmentary perspective view of a detail of the carriage mounting.

Figs. 6 and 7 are fragmentary sectional views taken respectively on the lines 6—6 and 7—7 of Fig. 3.

Fig. 8 is a sectional plan view of the carriage wheel propelling unit taken on the line 8—8 of Fig. 10.

Fig. 9 is a side elevation of the same looking in the direction of the arrow 9 in Fig. 10.

Fig. 10 is a side view partly in section, the section being taken on the line 10—10 of Fig. 8.

Figs. 11, 12 and 13 are sectional views taken respectively on the lines 11—11, 12—12 and 13—13 of Fig. 10.

Referring to Figs. 1 and 2, 20 and 20 are end frames tied together by bars 21 and 22 which carry bars 23 and 24 respectively. Bar 23 is fastened to an angle bar 25 cooperating with two hook plates 26 each fastened to a bracket 27 providing a shelf 28 for supporting a plurality of bars 29 upon which the work 30 may be placed. The brackets 27 are adjustable along the angle bar 25 and each carries a pad 31 bearing against the bar 24 to maintain the shelf 28 substantially horizontal.

The frames 20 and 21 support posts 40 the upper ends of which are tied together by cross bars 41 supporting side rails 42 and 43 which are held in spaced relation by spacer rods 44 welded at 45 and 46. A plane table or board 47 rests upon the spacers 44 and is secured thereto by screws 48. The top surface of the rail 42 provides a track for receiving two wheels or rollers 50 pivotally supported by trunnion blocks 51 attached by bolts 52 and nuts 53 to a longitudinally movable carriage 54. The carriage 54 is supported also by a roller 55 which bears upon the upper surface of the rail 43. Roller 55 is pivotally secured to an angle bracket 56 attached to the carriage 54. The bolts 52 carry rollers 57 bearing against a plane vertical surface of the rail 42. These rollers 57 are yieldingly maintained against the rail 42 by rollers 58, pivotally supported by block 59 which are pivoted on studs 60 attached to the carriage 54. Each roller 58 is urged toward the beveled side surface 61 of the rail 52 by a spring 62 bearing against an ear 63 integral with the carriage 54 and against the block 59. In this way the carriage 54 is permitted to move linearly only along the tracks provided by the rails 42 and 43.

The longitudinally movable carriage 54 carries a transversely movable carriage 70 having a bottom plane surface resting upon pairs of rollers 71 journalled on a trunnion rod 72 held by a bracket 73 attached to the under side of the carriage 54 as shown more clearly in Fig. 7. The carriage 70 is provided with parallel side surfaces 74 which converge upwardly and which are engaged by pairs of rollers 75, 76. The two rollers 75 are pivotally supported on trunnion bolts 77 attached to ears 78 provided by the carriage 54. Each roller 76 is pivotally mounted on a trunnion bolt 78 attached to a bar 79 pivoted upon a stud 80 fastened to an extension 81 of the carriage 54. Each roller 76 is yieldingly urged toward the transverse carriage 70 by a spring 82 bearing at one end against an ear 83 integral with the carriage 54 and at the other end against the bar 79.

Near one end thereof, the carriage 70 carries a trunnion pin 90 which pivotally supports a bracket 91 which includes a tubular member 92 providing a guide for the sliding movement of a tubular torch frame 93 providing at its upper end connections 94 and 95 with hoses 96 and 97 respectively connected with oxygen and acetylene gas tanks. The lower end of the frame 93 carries a torch nozzle 98. The torch frame 93 can be moved upwardly or downwardly with respect to the bracket 91 by a rack and pinion device, the rack being shown at 99 as attached to the torch frame 93 and the pinion being operated by a hand wheel 100 having a bearing in a block 101 carried by the bracket 91. The bracket 91 may be secured in a vertical position or in an inclined position by the tightening of a hand wheel screw 102 which passes through an arcuate slot 103 in the bracket 91 and is threadedly connected with a plate 104 integral with the carriage 70. In this way the location of the torch nozzle 98 can be varied to accommodate the apparatus for burning through pieces of different thickness. By adjusting the inclination of the torch frame 93 with respect to the carriage 70 the torch can be located so that it will burn through at an angle thereby providing a piece with a beveled edge.

The torch carriage 70 is propelled in any desired direction at a uniform rate by a motor driven propeller which will now be described with particular reference to Figs. 8 to 13 inclusive. The propeller comprises a frame 110 having at its lower end ears 111 and 112 carrying respectively an adjustable trunnion screw 113 and a non-adjustable trunnion block 114 each having a conical end extending into a similar recess in one end of a trunnion block 115 secured by screws 116 to the transversely movable frame 70. The frame 100 provides ways 120 for guiding a motor 121 which is permitted to slide axially with respect to its armature shaft along the surface 122 of the frame 110. The motor shaft carries a friction disc 123 engageable with a friction disc 124 attached to a sleeve 125 having a longitudinal spline connection 126 with a shaft 127 journalled in a bearing 128 provided by an extension 129 of the bracket 110 and in a bearing 130 provided by a cover 131 attached by screws 132 to a cup-shaped gear housing 133. The cover 131 has its bearing portion 130 journalled in a ball bearing 134 provided by the bracket 110. The housing 133 has a tubular shank 135 journalled in a bearing 136 carried by a bracket 137 attached to the bracket 110 and located in alignment with the bearing 134. The shank 135 provides a bearing for a shaft 138 located in alignment with the shaft 137 and connected therewith by three trains of planetary gears which will now be described.

The shaft 127 drives a gear 140 meshing with planetary gears 141 which mesh with an internal gear 142 as shown in Fig. 11. The gears 141 are mounted on pivot studs 143 carried by a plate 144 attached to a gear 145 mounted on an extension 146 of shaft 127. Gear 145 meshes with planetary gears 147 meshing with an internal gear 148 and carried by pivot studs 149 supported by a plate 150 as shown in Fig. 12. The plate 150 drives a gear 151 mounted on the extension 152 of shaft 138. Gear 151 meshes with planetary gears 153 meshing with an internal gear 154. Gears 153 are mounted on pivot studs 155 which are carried by a plate 156 drivingly connected with the shaft 138. The internal gear 142 is prevented from turning relative to the housing 133 by the screws 132 which secure the cover 131 to the housing 133. The internal gears 148 and 154 rest upon annular ledges provided by the housing 133 and are prevented from turning by pins 157 and 158 respectively which extend from diametrically opposite sides of the housing 133 into notches provided by the internal gears.

The shaft 138 has a head portion 160 drivingly connected with a bevel gear 161 meshing with a bevel gear 162 supported by a stub shaft 163 supported by a frame 164 which is attached by a screw 165 to the tubular shank 135 of the housing 133. The gear 162 drives a gear 166 meshing with a gear 167 mounted on a stub shaft 168 and driving a wheel 169 which rests upon the board 47 which carries the template or drawing with which the wheel 169 is intended to track.

The friction wheel 123 carried by the motor 121 is urged against the friction wheel 124 carried by the shaft 127 by a spring 170 bearing at one end against the bracket 110 and at the other against a lug 171 attached to the base frame 172 of the motor (see Figs.

8 and 10). In order to vary the gear ratio between the motor shaft and the shaft 127 the sleeve 125 which carries the gear 124 is adjustable along the shaft 127 by turning a handwheel 173 attached to a shaft 174 having a screw threaded portion 175 cooperating with a nut 176 having an arm 177 received by the annular groove 178 in the sleeve 125. The shaft 174 is journalled in suitable bearings provided by the bracket 110 and its extension 129, and axial movement thereof is restrained by securing to the shaft a collar 179, which bears against one side of the extension 129 located between said collar 179 and the handwheel 173.

The manner of using the device will now be described. The plate of material 30 from which a piece is to be cut by a metal burning operation is placed on suitably spaced bars 29 resting upon the brackets 27. A template or drawing is placed upon the table 47, the torch is turned on and ignited and the operator then places the wheel 169 against the template or upon a line of the drawing. While maintaining hold of the gear housing 133 so that it will not turn with the rotating shaft 127, rotary movement will be transmitted through the planetary gearing, bevel gearing and spur gearing to the tracker wheel 169, which will turn at a relatively low speed which is sufficient to permit the torch to burn through the metal. The torch moves in a direction corresponding to the direction of movement of the wheel 169 along the table 48. The operator does not push upon the bracket 110 to assist in any movement thereof but simply maintains hold of the gear housing 133 or the frame 164 in order to guide the tracker wheel 169 along the template or drawing. Since the wheel 169 rotates at a uniform speed the width of cut or metal burned away by the torch will be substantially uniform so that the edge of the piece required will be relatively smooth. Where it is desired to burn in a straight line a bar or straight edge 180 may be secured to the table 47 in the desired position as shown in Fig. 10. This bar will cooperate with the tracker wheel 169 in such manner that rotation of the housing 133 is prevented hence, the operator need not maintain hold of the housing 133 while the wheel 169 remains in engagement with the bar 180. When it is desired to cut a circular disc from a plate, a radius bar 181 is attached at one end to the frame 164 as shown in Fig. 10 and the other is secured pivotally to the board 47 by a pivot pin 182 adjustably secured to the bar 181 at the desired radial distance from the wheel 169. For purpose of making this adjustment, the pin 182 is integral with a screw 183 passing through an elongated slot 184 in the bar 181. By holding the screw 183 from rotating by applying a screw driver to the screw 183, a nut 185 cooperating with the screw 183 is tightened to clamp a washer 186 against the bar 181 and the bar 181 against a shoulder 187 provided by the screw 183.

If, after a cutting operation, performed without the use of an auxiliary device for directing the movement of the wheel 169, the operator releases his hold on the housing 133 of frame 164, the housing 133 will rotate without there being any motion transmitted to the tracker wheel 169. This wheel simply rotates upon its point of conact with the table about a diametrical axis in alignment with the axis of the shaft 138. Hence, it is not necessary to turn off the current to the motor 121 immediately after a torch cutting operation. Instead of switching off the current to the motor, rotation of the shaft 127 may be stopped by disconnecting the friction disc 123 from the friction disc 124. This is accomplished by turning an eccentric cam 190 attached to the motor frame 172 adapted to bear against the lug 171 (see Figs. 8 and 10). This is accomplished by turning a handle 191 attached to a shaft 192 which carries the eccentric 190. When this handle is turned 180 degrees from the position shown in Fig. 10, the cam 190 will be turned the same amount so as to maintain the lug 171 in a position toward the right of that shown in Figs. 8 and 10.

When it is desired to lift the wheel 169 from the table, the operator tilts the bracket 110 about its trunnion block 115 and secures the bracket 110 in elevated position by a latch lever 194 pivoted upon a bolt 195 attached to the frame. The lever 194 has a lug 196 for engaging a standard 197 which holds the bracket 110 in such position that the wheel 169 is elevated from the table.

While the form of embodiment of the present invention as herein disclosed, constitutes a preferred form, it is to be understood that other forms might be adopted, all coming within the scope of the claims which follow.

What I claim:

1. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table and a bracket pivotally attached to the carriage and supported by means including also the wheel.

2. Apparatus for dividing metal comprising in combination, a work piece support, a torch for melting the metal along the line of intended separation, a plane table for receiving a template, or drawing denoting the manner of dividing the work piece, a carriage supported for linear movement relative to the table in a manner such as longitudinally, a second carriage supported by the first carriage and guided thereby for linear movement transverse to the movement of the first carriage, said torch being supported by the second carriage, and means for propelling the carriages comprising a motor driven tracker wheel engageable with the plane table and a bracket pivotally attached to the second carriage and supported by means including also the tracker wheel.

3. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket pivotally attached to the carriage and supported by the wheel and an electric motor geared to the wheel and supported by means including also the bracket.

4. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket attached to the carriage and supported by the wheel, an electric motor supported by the carriage, means for connecting the motor with the wheel and including two aligned shafts located on an axis at right angles to the axis of the wheel and in alignment with the point of contact of the wheel with the plane table, a train of spur, planetary and internal gears for connecting said shafts, a frame supported by the bracket for rotation concentrically with respect to said shafts and providing a gear housing to which the internal gear is secured, and a frame rotatably supporting the tracker wheel and carried by the gear housing frame whereby the tracker wheel may be turned upon a diametrical axis perpendicular to the plane table, said gear housing frame serving as a manually operable means for guiding the tracker wheel.

5. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket attached to the carriage and supported by the wheel, an electric motor for driving the wheel, means connecting the motor with the wheel and including a shaft rotatably supported by the bracket, a frame rotatably supported by the bracket concentrically with respect to the shaft, and a second frame supported by the wheel and attached to the first frame in a manner such that the axis of the first frame is in alignment with the point of contact of the tracker wheel with the plane table.

6. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket pivotally attached to the carriage and supported by means including also the wheel, an electric motor for driving the wheel, and a frame rotatably supported by the bracket and supported by the wheel in a manner such that the axis of rotation of the frame is in alignment with the point of contact between the wheel and the plane table.

7. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket pivotally attached to the carriage and supported by means including also the wheel, an electric motor supported by the bracket and adjustable speed ratio gearing for connecting the motor with the wheel.

8. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket pivotally attached to the carriage and supported by means including also the wheel, an electric motor supported by the bracket, and disconnectible gearing for connecting the motor with the wheel.

9. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket attached to the carriage and supported by the wheel, an electric motor supported by the bracket, and friction gears for connecting the motor with the wheel said gears being mounted on shafts at right angles, and means for moving one of the shafts to disconnect the gearing.

10. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket attached to the carriage and supported by the wheel, an electric motor supported by the bracket, friction gears for connecting the motor with the wheel said gears being mounted on shafts at right angles and means for moving one of the friction gears axially to vary the speed ratio.

11. Apparatus for dividing metal comprising in combination, a work piece support, a torch for melting the metal along the line of intended separation, a carriage for supporting the torch, a plane table for receiving a template or drawing denoting the manner of dividing the work piece, and means for moving the carriage at a uniform rate relative to a line on the plane table, said means comprising a motor driven wheel for tracking with the drawing or template on the table, a bracket attached to the carriage and supported by the wheel, an electric motor supported by the bracket, gearing for connecting the motor with the wheel including a train of gears having their axes at right angles, one of the gears being mounted on the motor shaft, means provided by the bracket for guiding the motor for bodily movement longitudinally with respect to the motor shaft and manually operable means for imparting such bodily movement to the motor in order to separate the gears.

In testimony whereof I hereto affix my signature.

LEO C. SHIPPY.